(No Model.)
2 Sheets—Sheet 1.
H. D. COGSWELL.
ORNAMENTATION OF GROUNDS.
No. 253,186. Patented Feb. 7, 1882.
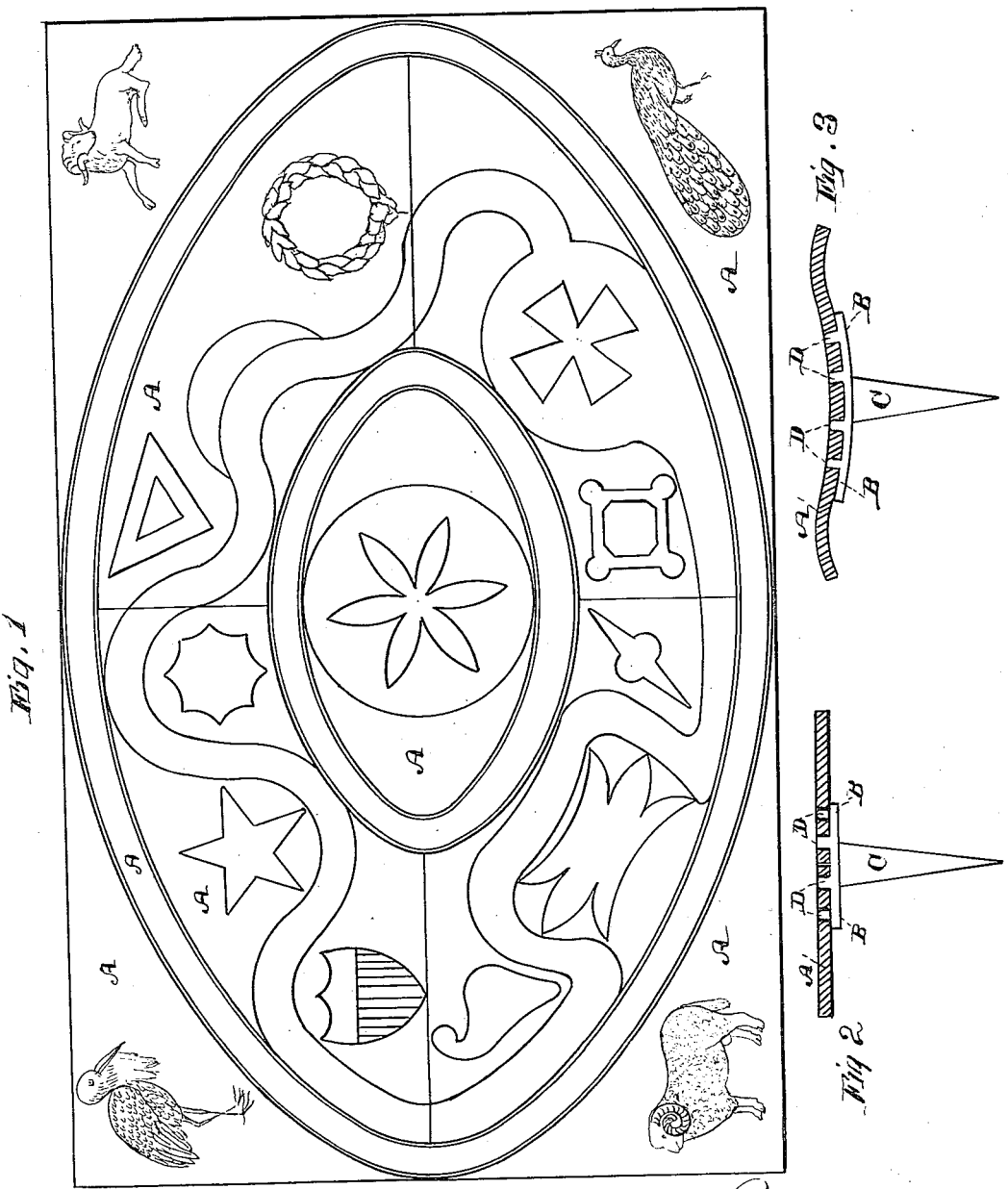

(No Model.) 2 Sheets—Sheet 2.
H. D. COGSWELL.
ORNAMENTATION OF GROUNDS.
No. 253,186. Patented Feb. 7, 1882.
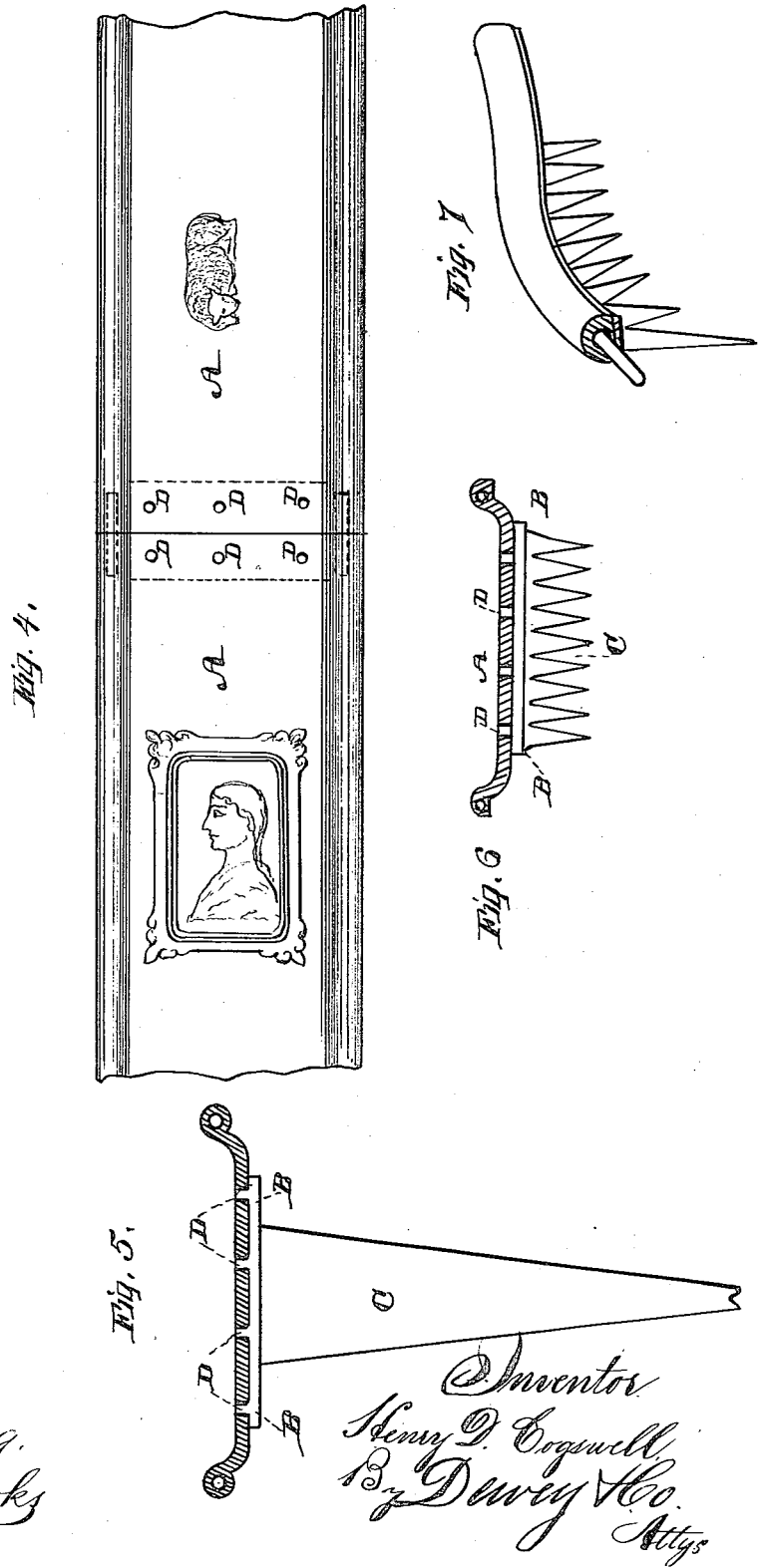
Witnesses
Geo. H. Strong.
Frank M. Brooks
Inventor
Henry D. Cogswell
By Dewey & Co.
Attys

United States Patent Office.

HENRY D. COGSWELL, OF SAN FRANCISCO, CALIFORNIA.

ORNAMENTATION OF GROUNDS.

SPECIFICATION forming part of Letters Patent No. 253,186, dated February 7, 1882.

Application filed October 8, 1881. (No model.)

*To all whom it may concern:*

Be it known that I, HENRY D. COGSWELL, of the city and county of San Francisco, State of California, have invented a new and useful Ornamentation of Grounds; and I do hereby declare the following to be a full, clear, and exact description thereof.

My invention relates to the ornamentation of grounds, such as cemetery-lots, gardens, lawns, public parks, the spaces around fountains or walks, or open spaces of any description; and it consists in the formation of gutters or ornamental spaces of artificial stone, asphalt, terra-cotta ware, metal, or other suitable material, in sections which have uniting-flanges and particular kind of supports, by which they are kept level and in place. These gutters and grounds may have spaces or openings formed in them of the shape of birds, animals, astronomical or geometrical or other ornamental figures, proportional to the size of the space, through which grass or other vegetation is allowed to grow, so as to form the device which is cut out.

Referring to the accompanying drawings for a more complete explanation of my invention, Figure 1 is a plan view, showing the application of my invention. Figs. 2, 3, 5, 6, and 7 are views of the supports for the meeting ends of the sections. Fig. 4 is a view of the gutter-section.

A are the surfaces, spaces, or gutters forming my devices, which I desire to ornament. These surfaces are formed in sections of any suitable size for handling, and the edges of these sections are brought together so as to rest upon the supports B. These supports may be straight or curved to suit the form of the meeting sections, and may have a triangular or other shaped section, C, extending downward from the support, so as to enter the ground and hold them firmly in place. These supports are preferably made of metal. These sections A or their extensions are perforated near the ends, so that when the sections abut closely their perforated ends will fit over pins or lugs D, which are made to project upward from the supports, as shown. This enables me to make a tight perfect joint where the sections meet, and it enables me to lift the sections and remove them at any time to renew or cultivate the earth beneath, when needed. The sections may be formed with openings or perforations of any fanciful or geometrical form, or of the form of birds or animals, astronomical or other figures, including portraits in relief. Beneath them the soil is properly prepared and is sown with grass, flowers, or other vegetation, so that these forms will appear above the surface in the colors of the vegetations. These figures may also be made of a skeleton form in metal, terra-cotta ware, artificial stone, or other material, as by the union of galvanized wires. They stand up in relief above the surfaces upon which they are placed when these surfaces are flat, and are left sufficiently open from below to allow the grass or other vegetation to grow up through the skeleton and entirely envelop it from the outside. It may then be trimmed, so as to preserve the outline of the figure. If the figures are to stand close to a wall, only the front half need be completed, the rear portion being left open. In this way various forms, as oval, square, round, diamond, or other regular or irregular figures, may be constructed and ornamented at such points as may be desired.

In the ornamentation of grounds the walks may be graveled or any other style, with broad shallow gutters formed at the sides, as above described, the bottoms being wide enough to allow the figures to be formed as above described, and sown to grass, clover, box, or flowers.

The figures of animals, birds, &c., may be placed in the corners of square lots, or on any suitable points in oval or round lots, according to fancy or convenience.

Having thus described my invention, what I claim as new, and desire to secure by Letters Patent, is—

1. Gutters for landscape ornamental gardening purposes, provided with openings of fanciful form cut in their surfaces and covered with raised skeleton-frames, through which may be trained the protruding vegetation, as specified.

2. The sections A, having their meeting ends perforated, as shown, in combination with the supports B, having the pins or lugs D, and the extension C, substantially as and for the purpose herein described.

In witness whereof I have hereunto set my hand.

HENRY D. COGSWELL.

Witnesses:
  S. H. NOURSE,
  FRANK A. BROOKS.